(12) United States Patent
He et al.

(10) Patent No.: US 12,335,070 B2
(45) Date of Patent: Jun. 17, 2025

(54) TRANSMITTER AND SIGNAL TRANSMITTING METHOD THEREOF

(71) Applicant: SigmaStar Technology Ltd., Fujian (CN)

(72) Inventors: Ze-Wei He, Shanghai (CN); Kai Sun, Shanghai (CN); Yin-Yin Gu, Shanghai (CN)

(73) Assignee: SIGMASTAR TECHNOLOGY LTD., Fujian (CN)

( * ) Notice: Subject to any disclaimer, the term of this patent is extended or adjusted under 35 U.S.C. 154(b) by 54 days.

(21) Appl. No.: 18/392,172

(22) Filed: Dec. 21, 2023

(65) Prior Publication Data

US 2024/0259237 A1 Aug. 1, 2024

(30) Foreign Application Priority Data

Jan. 30, 2023 (CN) .......................... 202310083879.X

(51) Int. Cl.
*H04L 25/02* (2006.01)
(52) U.S. Cl.
CPC ........ *H04L 25/0272* (2013.01); *H04L 25/028* (2013.01)

(58) Field of Classification Search
CPC .......................... H04L 25/0272; H04L 25/028
See application file for complete search history.

(56) References Cited

U.S. PATENT DOCUMENTS

| | | | | |
|---|---|---|---|---|
| 8,638,838 B1* | 1/2014 | Betts | ....................... | H04L 7/033 375/295 |
| 2014/0215245 A1* | 7/2014 | Zhang | ................... | G06F 1/3234 713/323 |
| 2015/0123826 A1* | 5/2015 | Lee | .......................... | H03M 9/00 341/101 |
| 2023/0361804 A1* | 11/2023 | Moon | ....................... | H04B 1/40 |
| 2025/0080145 A1* | 3/2025 | Park | ....................... | H04L 7/0091 |

* cited by examiner

*Primary Examiner* — Freshteh N Aghdam
(74) *Attorney, Agent, or Firm* — Edell, Shapiro & Finnan, LLC

(57) ABSTRACT

The transmitter includes a serializer, a main driver and an auxiliary driver. The serializer sequentially outputs, according to a clock signal, a first signal and a second signal as two consecutive data of a first output signal, and detects whether the first signal and the second signal are the same so as to generate a control signal. The main driver generates a second output signal according to the first output signal. The auxiliary driver is selectively switched according to the control signal, wherein the main driver and the auxiliary driver are powered by the same supply voltage.

10 Claims, 4 Drawing Sheets

TRANSMITTER AND SIGNAL TRANSMITTING METHOD THEREOF

This application claims the benefit of China application Serial No. CN202310083879.X, filed on Jan. 30, 2023, the subject matter of which is incorporated herein by reference.

BACKGROUND OF THE INVENTION

Field of the Invention

The present application relates to a transmitter, and more particularly to a transmitter having a stable voltage mechanism and a signal transmitting method thereof.

Description of the Related Art

A transmitter may be used to transmit data to another device. According to different types of data to be transmitted, a transmitter may result in different current consumptions in different periods. For example, if the type of data to be transmitted is multiple consecutive different data values, internal circuits in the transmitter are constantly switched, resulting in a larger dynamic current. Alternatively, if the type of data to be transmitted is multiple consecutive same data values, internal circuits in the transmitter do not need to be switched, resulting in a more stable current. In the cases above, a power supplied to the transmitter needs to have a better adjustment capability and/or have a larger filter capacitor, so as to adapt to requirements of high-speed data transmissions. However, with the increase in data transmission rates, the bandwidth and adjustment capability of power supplies have become insufficient for supporting existing high-speed data transmission rates (for example, in the scale of GHz). On the other hand, if the capacitance value of a filter capacitor is increased, the overall area and cost of a chip may be overly increased, similarly leading to a decrease in the bandwidth of power supplies.

SUMMARY OF THE INVENTION

In some embodiments, it is an object of the present application to provide a transmitter having a stable voltage mechanism and a signal transmitting method thereof so as to improve the issues of the prior art.

In some embodiments, the transmitter includes a serializer, a main driver and an auxiliary driver. The serializer sequentially outputs, according to a clock signal, a first signal and a second signal as two consecutive data of a first output signal, and detects whether the first signal and the second signal are the same so as to generate a control signal. The main driver generates a second output signal according to the first output signal. The auxiliary driver is selectively switched according to the control signal, wherein the main driver and the auxiliary driver are powered by the same supply voltage.

In some embodiments, the signal transmitting method includes the following operations: sequentially outputting, according to a clock signal, a first signal and a second signal as two consecutive data of a first output signal, and detecting whether the first signal and the second signal are the same so as to generate a control signal; generating a second output signal according to the first output signal by a main driver; and selectively switching an auxiliary driver according to the control signal, wherein the main driver and the auxiliary driver are powered by the same supply voltage.

Features, implementations and effects of the present application are described in detail in preferred embodiments with the accompanying drawings below.

BRIEF DESCRIPTION OF THE DRAWINGS

To better describe the technical solution of the embodiments of the present application, drawings involved in the description of the embodiments are introduced below. It is apparent that, the drawings in the description below represent merely some embodiments of the present application, and other drawings apart from these drawings may also be obtained by a person skilled in the art without involving inventive skills.

DETAILED DESCRIPTION OF THE INVENTION

All terms used in the literature have commonly recognized meanings. Definitions of the terms in commonly used dictionaries and examples discussed in the disclosure of the present application are merely exemplary, and are not to be construed as limitations to the scope or the meanings of the present application. Similarly, the present application is not limited to the embodiments enumerated in the description of the application.

The term "coupled" or "connected" used in the literature refers to two or multiple elements being directly and physically or electrically in contact with each other, or indirectly and physically or electrically in contact with each other, and may also refer to two or more elements operating or acting with each other. As given in the literature, the term "circuit" may be a device connected by at least one transistor and/or at least one active element by a predetermined means so as to process signals.

Figure 1:
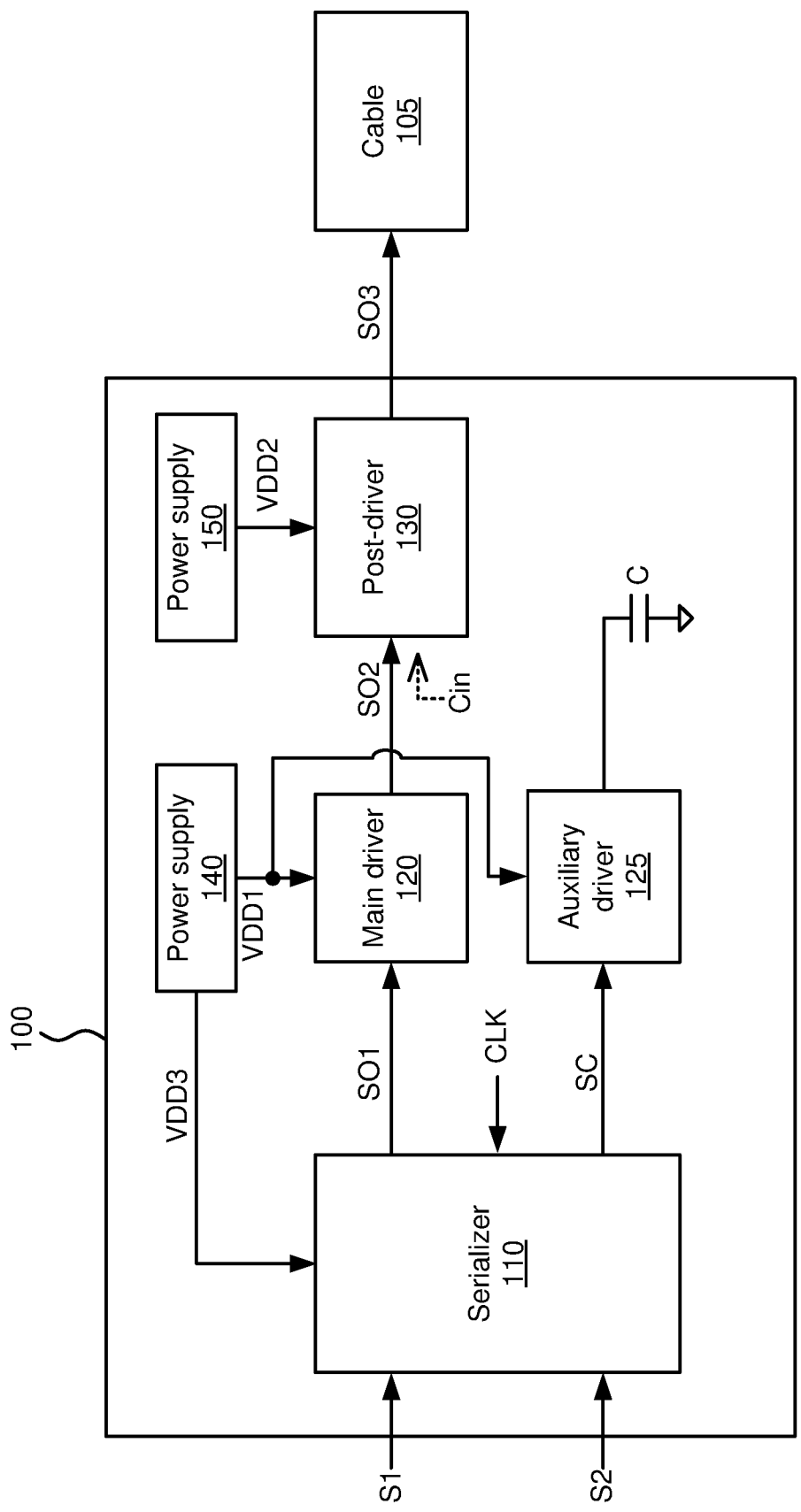
FIG. 1 is a schematic diagram of a transmitter according to some embodiments of the present application.

FIG. 1 shows a schematic diagram of a transmitter 100 according to some embodiments of the present application. In some embodiments, the transmitter 100 may be a transmitter for wired transmissions. The transmitter 100 includes a serializer 110, a main driver 120, an auxiliary driver 125, a post-driver 130, a power supply 140 and a power supply 150. The power supply 140 operates as a core power supply, and may provide a supply voltage VDD3 to the serializer 110 and a supply voltage VDD1 to the main driver 120 and the auxiliary driver 125 so as to power these circuits. In some embodiments, the power supply VDD3 and the power supply VDD1 may be the same voltage; however, the present application is not limited to the example above. The power supply 150 operates as a power supply for an input/output interface, and may provide a supply voltage VDD2 to the post-driver 130 so as to power the post-driver 130.

The serializer 110 may sequentially output, according to a clock signal CLK, a signal S1 and a signal S2 as two consecutive data in an output signal SO1. In other words, the serializer 110 may convert two parallel signals (that is, the signal S1 and the signal S2) into one series output (that is, the output signal SO1). The serializer 110 may further detect whether the signal S1 and the signal S2 are the same to generate a control signal SC.

In some embodiments, the main driver 120 and the auxiliary driver 125 may be identically structured pre-drivers. In some embodiments, the main driver 120 operates as a main transmission path which may be used to transmit the output signal SO1, and the auxiliary driver 125 operates as an auxiliary transmission path which may be used to stabilize the supply voltage VDD1. More specifically, the main driver 120 may be coupled to the serializer 110 to receive the output signal SO1 and generate the output signal SO2 according to the output signal SO1. The auxiliary driver 125 may be coupled to the serializer 110 to receive the control signal SC and be selectively switched according to the control signal SC. For example, if the serializer 110 determines that the signal S1 and the signal S2 are the same, the auxiliary driver 125 is switched according to the control signal SC. Alternatively, if the serializer 110 determines that the signal S1 and the signal S2 are different, the auxiliary driver 125 is not switched according to the control signal SC. With the configuration above, it is ensured that both of the main driver 120 and the auxiliary driver 125 may sink approximate currents from power supply 140 in any given time period, so that the supply voltage VDD1 may be more stable. Related operation details are to be described with reference to FIG. 2 and FIG. 3 below. The post-driver 130 is coupled to the main driver 120 so as to receive the output signal SO2. The post-driver 130 may generate an output signal SO3 according to the output signal SO2, and transmit the output signal SO3 to other devices (not shown) via a cable 105.

Figure 2:
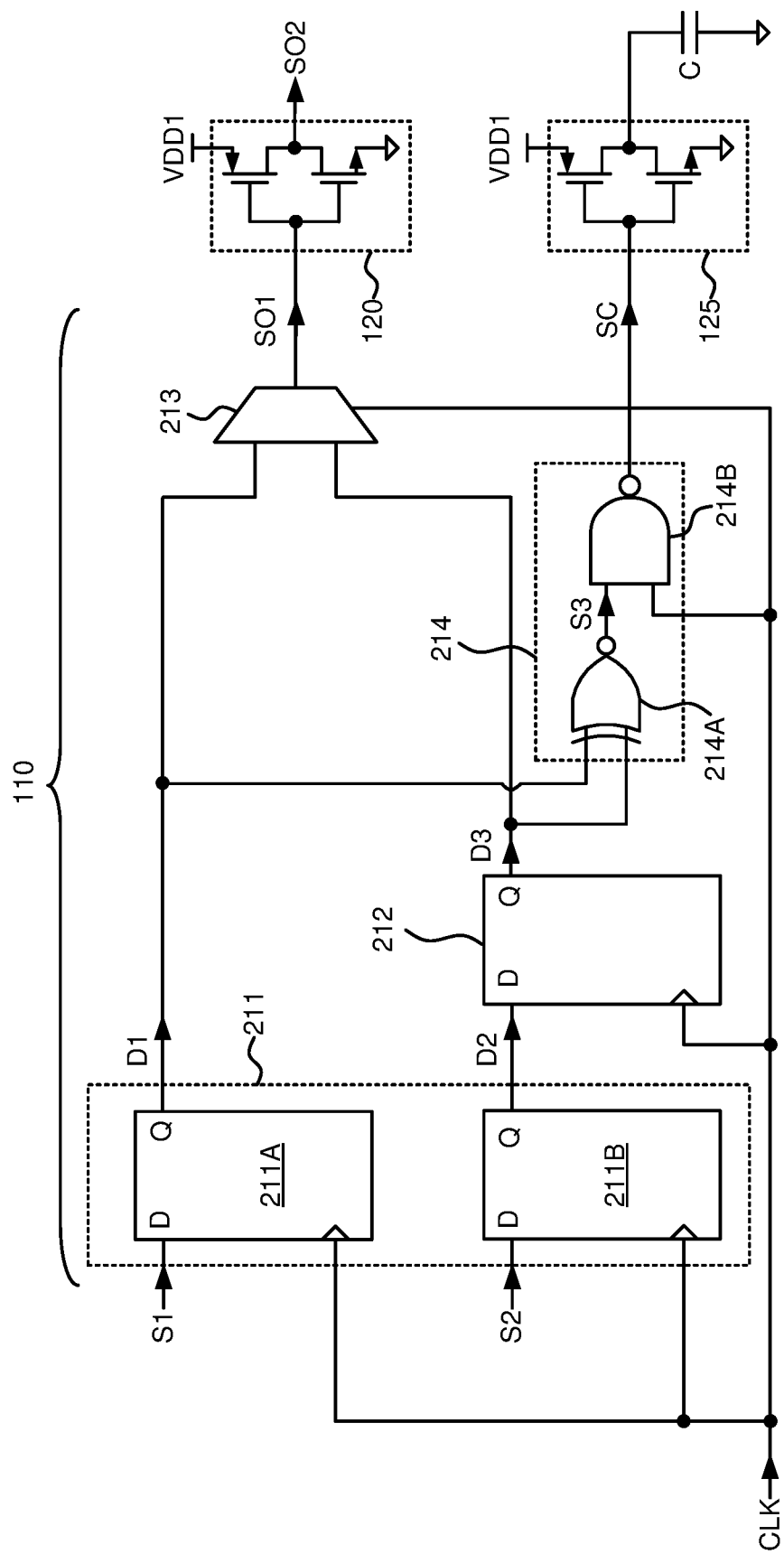
FIG. 2 is a circuit schematic diagram of a serializer, a main driver and an auxiliary driver in FIG. 1 according to some embodiments of the present application.

FIG. 2 shows a circuit schematic diagram of the serializer 110, the main driver 120 and the auxiliary driver 125 in FIG. 1 according to some embodiments of the present application. The serializer 110 includes a data capture circuit 211, a buffer circuit 212, a multiplexer 213 and a detection circuit 214. The data capture circuit 211 outputs the signal S1 and the signal S2 as data D1 and data D2 according to the clock signal CLK. In some embodiments, the data capture circuit 211 may include a D-flip-flop 211A and a D-flip-flop 211B. The D-flip-flop 211A outputs the signal S1 as the data D1 according to the clock signal CLK. The D-flip-flop 211B outputs the signal S2 as the data D2 according to the clock signal CLK.

The buffer circuit 212 temporarily stores the data D2 as data D3 according to the clock signal CLK. The buffer circuit 212 may be, for example but not limited to, a D-latch, which may temporarily store the data D2 as the data D3 according to the clock signal CLK. The detection circuit 214 may compare the data D1 with the data D3 (that is, the temporarily stored data D2) to determine whether the signal S1 and the signal S2 are the same so as to generate the control signal SC. As described above, the signal S1 and the signal S2 are output as two consecutive data in the output signal SO1. For example, the signal S1 may be output as even-number data in the output signal SO1, and the signal S2 may be output as odd-number data in the output signal SO1. To determine whether the signal S1 and the signal S2 are the same, the signal S2 may be delayed by the buffer circuit 212 to align with the signal S1 in terms of time (that is, the data D1 may be aligned with the data D3). As such, the detection circuit 214 may compare the data D1 with the data D2 to determine whether two consecutive data in the output signal SO1 are the same.

In some embodiments, the detection circuit 214 may include a comparator 214A and a control signal generator 214B. The comparator 214A may compare the data D1 with the data D3 to generate a signal S3. In some embodiments, the comparator 124A may be, for example but not limited to, an XNOR gate, which may perform the operation above to generate the signal S3. For example, if the data D1 is the same as the data D3, the comparator 214A may output the signal S3 having a first logical value (for example, logic 1). Alternatively, if the data D1 is different from the data D3, the comparator 214A may output the signal S3 having a second logical value (for example, logic 0). The control signal generator 214B may generate the control signal SC according to the signal S3 and the clock signal CLK. In some embodiments, the control signal generator 214B may be, for example but not limited to, a NAND gate, which may perform the operation above to generate the control signal SC. For example, in response to the signal S3 having a first logical value, the control signal generator 214B may output the clock signal CLK as the control signal SC, such that the auxiliary driver 125 may be switched along with the clock signal CLK. Alternatively, in response to the signal S3 having a second logical value, the control signal generator 214B may output the control signal CS having a fixed logical value (for example, logic 1), such that the auxiliary driver 125 may stay not switched.

The multiplexer 213 may sequentially output, according to the clock signal CLK, the data D1 and D3 as two consecutive data of the output signal SO1. For example, when the clock signal CLK is at a first level, the multiplexer 214 outputs the data D1 as even-number data of the output signal SO1. Alternatively, when the clock signal CLK is at a second level different from the first level, the multiplexer 214 outputs the data D3 as odd-number data of the output signal SO1. In equivalence, multiple parallel signals S1 and S2 can be converted by the data capture circuit 211 and the multiplexer 213 into multiple consecutive data (that is, serialization) in the output signal SO1.

In this example, each of the main driver 120 and the auxiliary driver 125 may be an inverter circuit, which may be powered by the supply voltage VDD1. For example, each of the main driver 120 and the auxiliary driver 125 may be implemented by a P-type transistor and an N-type transistor set with the same size. As described above, the main driver 120 may generate the output signal SO2 according to the output signal SO1, and transmit the output signal SO2 to the post-driver 130 in FIG. 1. In some embodiments, an output terminal of the auxiliary driver 125 is coupled to a capacitor C, and does not transmit signals to other circuits. When the data D1 and the data D3 are different (that is, the signal S1 captured is different from the signal S2 captured), the auxiliary driver 125 may stay not switched in response to the control signal SC, and the main driver 120 consecutively outputs different data (because the data D1 and the data D3 are two consecutive data in the output signal SO1) and is switched. In other words, in this case, the main driver 120 is switched and hence consumes a dynamic current.

On the other hand, when the data D1 and the data D3 are the same (that is, the signal S1 captured is the same as the signal S2 captured), the auxiliary driver 125 may be switched in response to the control signal SC, and the main driver 120 consecutively outputs the same data and is not switched. In other words, in this case, the auxiliary driver 125 is switched and hence consumes a dynamic current. Accordingly, in either of the cases above, the corresponding one of the main driver 120 and the auxiliary driver 125 is switched, such that the overall consumption of the main driver 120 and the auxiliary driver 125 consume substantially equal dynamic currents. Thus, current fluctuation resulted on the power supply 140 that provides the supply voltage VDD1 in FIG. 1 is reduced, hence better stabilizing the power supply VDD1. In some embodiments, to ensure that the main driver 120 and the auxiliary driver 125 may generate substantially equal currents, the capacitance value of the capacitor C may be configured according to an input capacitance (for example, the input capacitor Cin in FIG. 1) of the post-driver 130. For example, the capacitance value of the capacitor C may be configured to be equal to the capacitance value of the input capacitor Cin of the post-driver 130. Thus, the main driver 120 and the auxiliary driver 125 are made to generate even similar dynamic currents when being switched.

Figure 3:
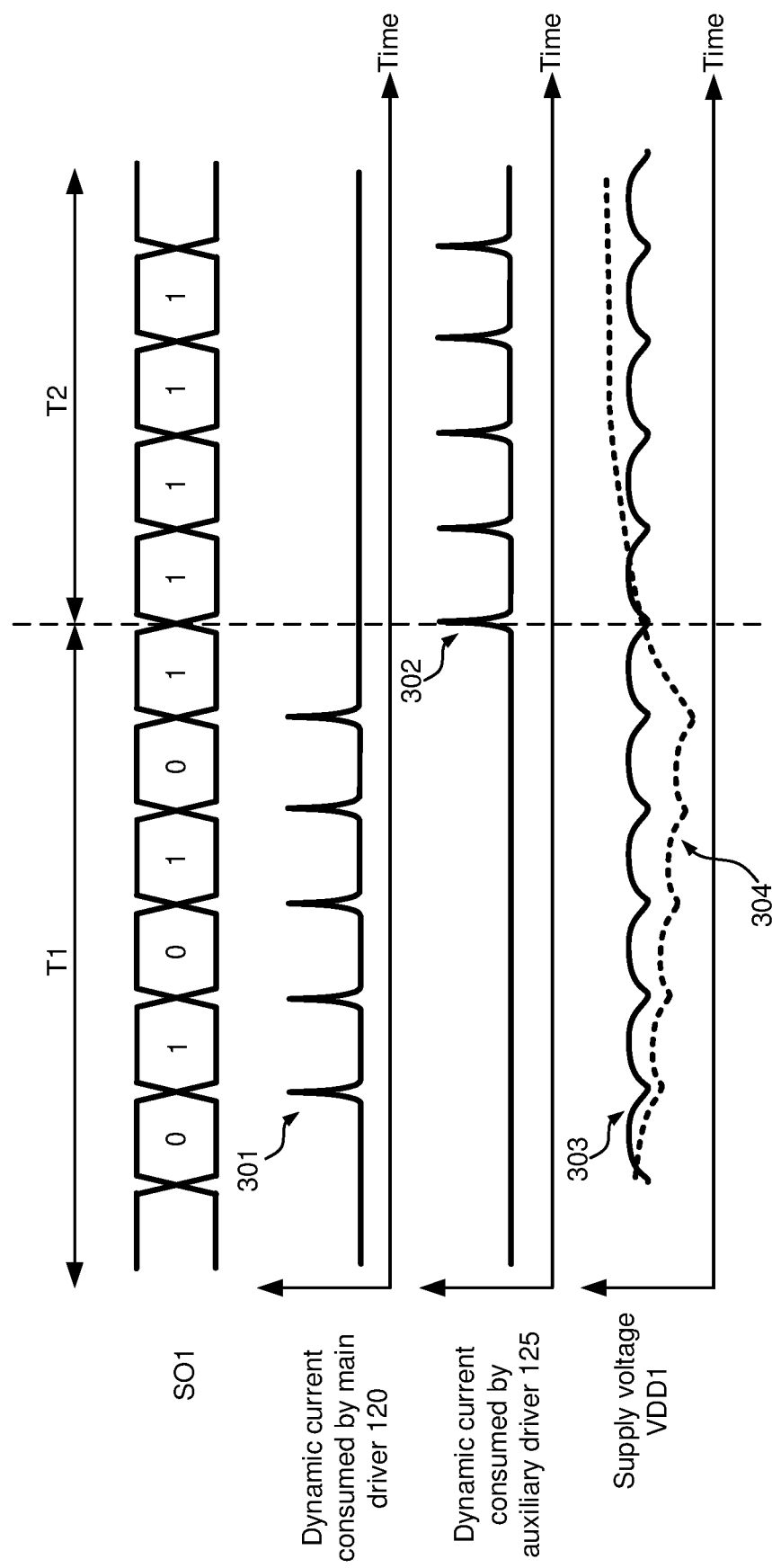
FIG. 3 is a dynamic waveform schematic diagram of part of signals and/or currents consumed by part of the circuits in FIG. 1 and/or FIG. 2 according to some embodiments of the present application.

FIG. 3 shows a dynamic waveform schematic diagram of part of signals and/or dynamic currents consumed by part of the circuits in FIG. 1 and/or FIG. 2 according to some embodiments of the present application. As shown in FIG. 3, the output signal SO1 includes multiple data, which may be logic 0, logic 1, logic 0, logic 1, logic 0 and logic 1 in a period T1, and multiple logic 1 in a period T2. The multiple data above may sequentially be data values of the signal S1 and the signal S2 at different timings.

In the period T1, since two consecutive data of the output signal SO1 are different from each other (that is, one logic 0 and one logic 1), it means that the main driver 120 is consecutively switched and hence generates multiple different data. As such, the main driver 120 results in a consumption of a dynamic current while the data are switched in the period T1. On the other hand, in this case, the auxiliary driver 125 stays not switched in response to the control signal SC and does not result in a consumption of a dynamic current (as the waveform 302 in FIG. 3).

In the period T2, since the two consecutive data of the output signal SO1 are the same (that is, both as logic 1), it means that the main driver 120 is continually not switched and outputs the same data. As such, the main driver 120 does not generated in a dynamic current in the period T2. On the other hand, in this case, the auxiliary driver 125 is switched in response to the control signal SC and generates a dynamic current (as the waveform 302 in FIG. 3). As shown in FIG. 3, since a substantially equal dynamic current is generated by a corresponding driver in both of the period T1 and the period T2, fluctuation in the supply voltage VDD1 in the period T1 and the period T2 appears quite moderate (as the waveform 303 in FIG. 3).

In contrast, if the auxiliary driver 125 for resulting an equivalent dynamic current in the period T2 is not provided, the supply voltage VDD1 (as the waveform 304 in a dotted line in FIG. 3) bears the consumption of a dynamic current in the period T1 and the level thereof gradually reduces. In the period T2, since the main driver 120 is likewise not switched, the power supply 140 regulates the supply voltage VDD1 and gradually restores the level of the power supply VDD1. By comparing the waveform 303 and the waveform 304, it is known that the supply voltage VDD1 has larger fluctuation due to high-speed data transmissions when the auxiliary driver 125 is not provided. In other words, with the auxiliary driver 125 provided, stability of the power supply VDD1 is effectively enhanced and better suitability is provided for high-speed transmissions.

Figure 4:
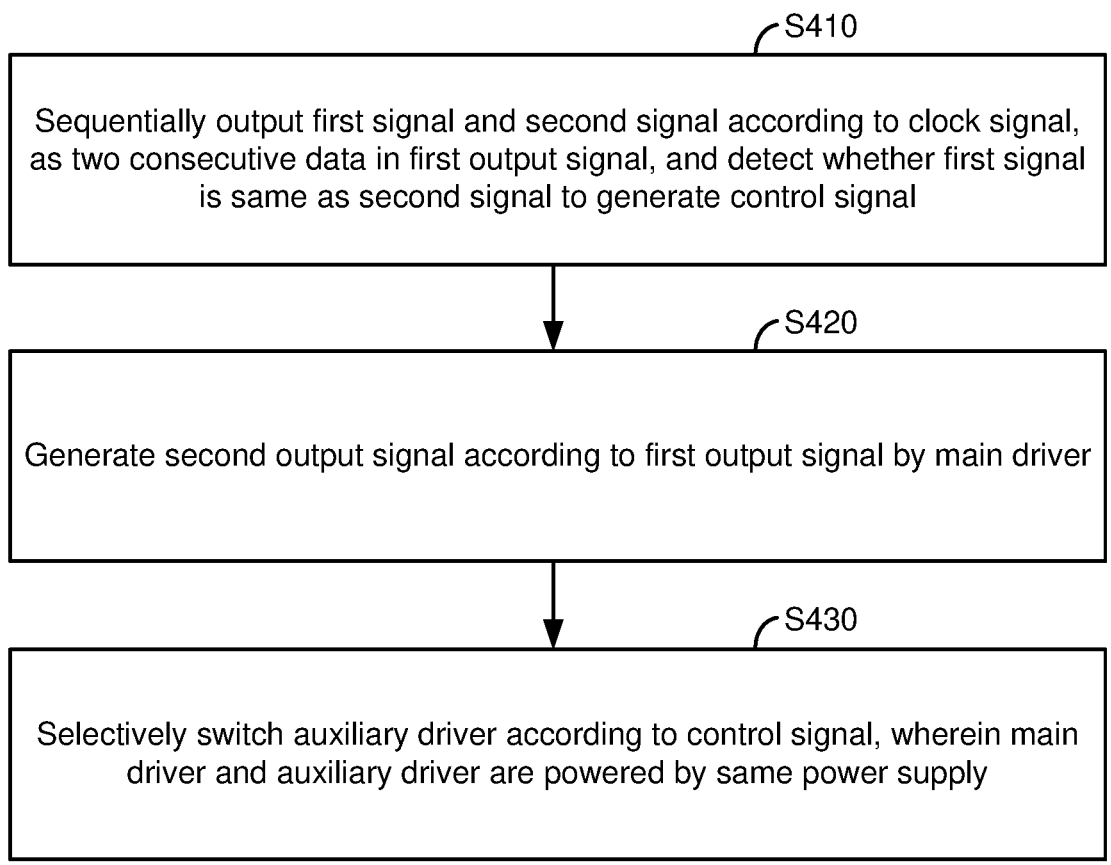
FIG. 4 is a flowchart of a signal transmitting method according to some embodiments of the present application.

FIG. 4 shows a flowchart of a signal transmitting method 400 according to some embodiments of the present application. In operation S410, a first signal and a second signal are sequentially output, according to a clock signal, as two consecutive data of a first output signal, and it is detected whether the first signal and the second signal are the same so as to generate a control signal. In operation S420, a second output signal is generated according to the first output signal by a main driver. In operation S430, an auxiliary driver is selectively switched according to the control signal, wherein the main driver and the auxiliary driver are powered by the same supply voltage.

Details associated with the multiple operations of the signal transmitting method 400 above can be referred from the details of the embodiments above, and are omitted herein. The plurality operations of the signal transmitting method 400 above are merely examples, and are not limited to being performed in the order specified in these examples. Without departing from the operation means and ranges of the various embodiments of the present application, additions, replacements, substitutions or omissions may be made to the operations of the signal transmitting method 400, or the operations may be performed in different orders (for example, simultaneously performed or partially simultaneously performed).

In conclusion, the transmitter and the signal transmitting method according to some embodiments of the present application are capable of improving stability of a supply voltage by using an auxiliary driver. Thus, the limitation caused by a regulation capability of a power supply is eliminated and a larger filter capacitor is not required, providing better suitability for applications related to high-speed transmission and reducing overall costs of chips.

While the present application has been described by way of example and in terms of the preferred embodiments, it is to be understood that the disclosure is not limited thereto. Various modifications made be made to the technical features of the present application by a person skilled in the art on the basis of the explicit or implicit disclosures of the present application. The scope of the appended claims of the present application therefore should be accorded with the broadest interpretation so as to encompass all such modifications.

What is claimed is:

1. A transmitter, comprising:
   a serializer, sequentially outputting, according to a clock signal, a first signal and a second signal as two consecutive data of a first output signal, and detecting whether the first signal and the second signal are the same so as to generate a control signal;
   a main driver, generating a second output signal according to the first output signal; and
   an auxiliary driver, selectively switched according to the control signal, wherein the main driver and the auxiliary driver are powered by the same supply voltage.

2. The transmitter according to claim 1, wherein the auxiliary driver is switched according to the control signal when the first signal and the second signal are the same, and is not switched according to the control signal when the first signal and the second signal are different.

3. The transmitter according to claim 1, further comprising:
   a post-driver, generating a third output signal according to the second output signal,
   wherein an output terminal of the auxiliary driver is coupled to a capacitor, and a capacitance of the capacitor is configured according to a capacitance value of an input capacitor of the post-driver.

4. The transmitter according to claim 1, wherein the serializer comprises:
   a data capture circuit, outputting the first signal and the second signal as a first data and a second data according to the clock signal, respectively;

a buffer circuit, temporarily storing the second data as a third data according to the clock signal;

a multiplexer, sequentially outputting the first data and the third data according to the clock signal, as two consecutive data in the first output signal; and a detection circuit, comparing the first data with the third data to generate the control signal.

5. The transmitter according to claim 4, wherein the data capture circuit comprises:
   a first D-flip-flop, outputting the first signal as the first data according to the clock signal; and
   a second D-flip-flop, outputting the second signal as the second data according to the clock signal.

6. The transmitter according to claim 4, wherein the buffer circuit comprises:
   a D-latch, outputting the second data as the third data according to the clock signal.

7. The transmitter according to claim 4, wherein the detection circuit comprises:
   a comparator, comparing the first data with the third data to generate a third signal; and
   a control signal generator, generating the control signal according to the third signal and the clock signal.

8. The transmitter according to claim 7, wherein the comparator is an XNOR gate.

9. The transmitter according to claim 7, wherein the control signal generator is a NAND gate.

10. A signal transmitting method, comprising:
   sequentially outputting, according to a clock signal, a first signal and a second signal as two consecutive data of a first output signal, and detecting whether the first signal and the second signal are the same so as to generate a control signal;
   generating a second output signal according to the first output signal by a main driver; and
   selectively switching an auxiliary driver according to the control signal, wherein the main driver and the auxiliary driver are powered by the same supply voltage.

* * * * *